United States Patent
Grundhoefer et al.

(10) Patent No.: US 11,610,088 B1
(45) Date of Patent: Mar. 21, 2023

(54) TIME VARYING VISUAL MARKER VERIFICATION AND DECODING

(71) Applicant: Apple Inc., Cupertino, CA (US)

(72) Inventors: Anselm Grundhoefer, Campbell, CA (US); Arun Srivatsan Rangaprasad, Sunnyvale, CA (US)

(73) Assignee: Apple Inc., Cupertino, CA (US)

(*) Notice: Subject to any disclaimer, the term of this patent is extended or adjusted under 35 U.S.C. 154(b) by 62 days.

(21) Appl. No.: 17/218,509

(22) Filed: Mar. 31, 2021

Related U.S. Application Data

(60) Provisional application No. 63/006,322, filed on Apr. 7, 2020.

(51) Int. Cl.
    *G06K 19/06*     (2006.01)
    *G06K 7/10*     (2006.01)

(52) U.S. Cl.
    CPC ...... *G06K 19/06112* (2013.01); *G06K 7/1095* (2013.01); *G06K 7/10722* (2013.01); *G06K 19/0614* (2013.01); *G06K 19/06075* (2013.01)

(58) Field of Classification Search
    CPC .............................................. G06K 19/06112
    USPC ....................................................... 235/494
    See application file for complete search history.

(56) References Cited

U.S. PATENT DOCUMENTS

| 9,087,277 | B2 | 7/2015 | Hwang et al. |
| 9,652,650 | B2* | 5/2017 | Pasik ............ G06K 7/14 |
| 9,667,823 | B2 | 5/2017 | Kim |
| 10,489,930 | B2 | 11/2019 | Weller et al. |
| 2005/0248471 | A1 | 11/2005 | Ryu |
| 2009/0084847 | A1* | 4/2009 | He ............ G06K 7/10752 235/455 |

OTHER PUBLICATIONS

Langlotz, Tobias; Bimber, Oliver; "Unsynchronized 4D Barcodes Coding and Decoding Time-Multiplexed 2D Colorcodes"; Bauhaus-University Weimar; pp. 1-12; Nov. 2007.

* cited by examiner

*Primary Examiner* — Toan C Ly
(74) *Attorney, Agent, or Firm* — Thompson Hine LLP

(57) ABSTRACT

Various implementations disclosed herein include devices, systems, and methods for verifying that an image includes a complete code of a time-varying visual marker that displays codes sequentially on a display. In some implementations, the verification determines that the image include a complete code rather than combinations of sequentially-displayed codes that may be included in an image based on use of a rolling shutter (e.g., in a camera of a detecting electronic device). In some implementations, the verification involves comparing a first verification portion of an image to a second opposing verification portion of an image. Various implementations disclosed herein include devices, systems, and methods for modifying image capture parameters (e.g., frame rate) to ensure capture of all codes of a time-varying visual marker.

13 Claims, 12 Drawing Sheets

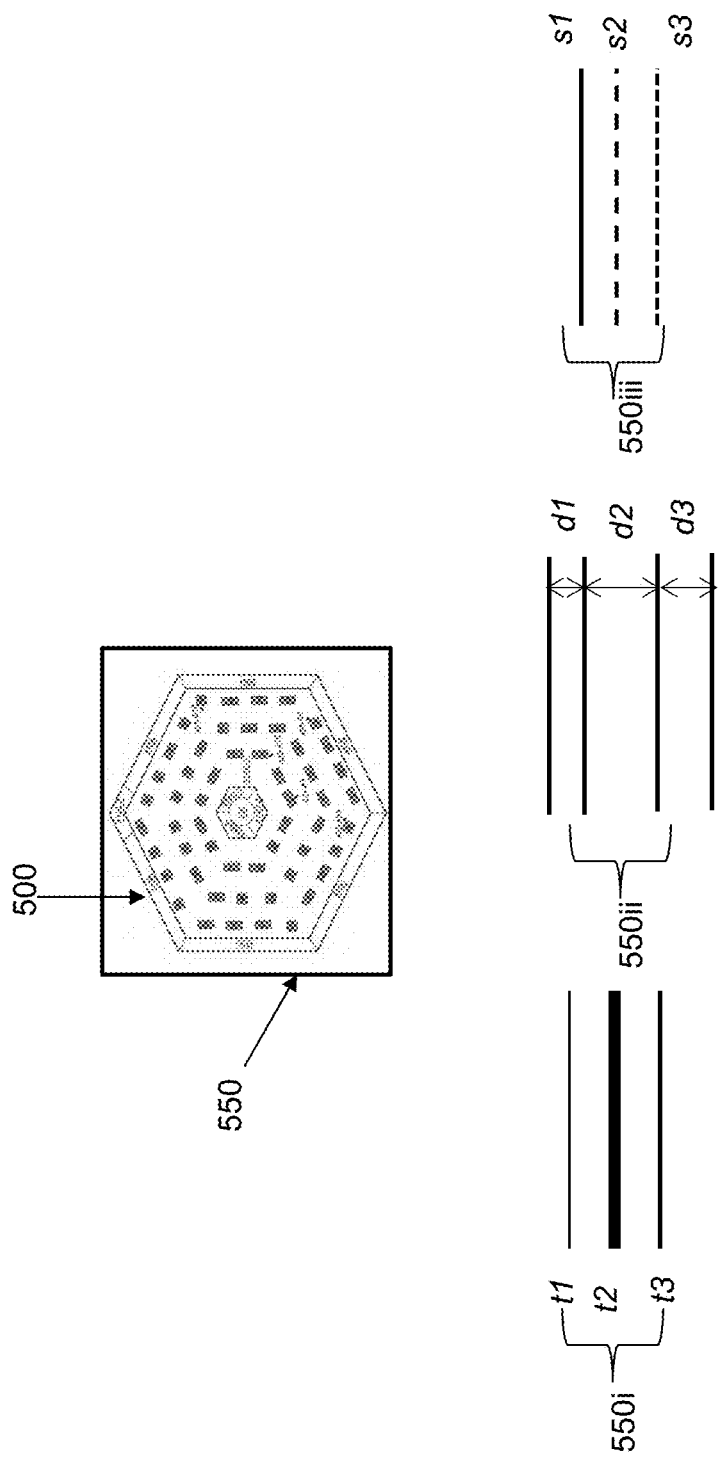

TIME VARYING VISUAL MARKER VERIFICATION AND DECODING

CROSS-REFERENCE TO RELATED APPLICATIONS

This application claims the benefit of U.S. Provisional Application Ser. No. 63/006,322 filed Apr. 7, 2020, which is incorporated herein in its entirety.

TECHNICAL FIELD

The present disclosure generally relates to electronic devices, and in particular, to systems, methods, and devices that involve electronic devices that capture images of and interpret visual markers.

BACKGROUND

Visual markers exist today in the form of barcodes, Quick Response (QR) codes, and other proprietary code-based systems. QR codes encode binary data such as strings or other payloads to initiate payments, link to websites, link to location-based experiences or contextual-based experiences, or launch into other web-based experiences.

SUMMARY

Various implementations disclosed herein include devices, systems, and methods for verifying that an image includes a complete code of a sequence of codes of a time-varying visual marker. In some implementations, the codes of the time-varying visual marker are sequentially displayed on a display (e.g., emissive, transmissive, self-luminescent, or reflective). In some implementations, the codes of the time-varying visual marker are objects that encode binary data such as strings or other payloads used to access remotely-based experiences. In some implementations, the verification determines that the image include a complete code rather than combinations of sequentially-displayed codes that may be included in an image, for example, based on use of a rolling shutter (e.g., in a camera of a detecting electronic device). In some implementations, the verification involves comparing a first portion of an image to a second portion of an image. For example, the time-varying visual marker may include surrounding combinations of rings that differ for (e.g., identify) each of the different codes, and verifying may involve matching the pattern of rings on one side (e.g., the top) with the pattern of rings on the opposing side (e.g., the bottom). This matching verifies that the image includes an entire single code rather than combined codes. In some implementations, the time-varying visual marker includes a sequence of n (e.g., 10) codes having colored markings that encode data, and thus, the time-varying visual marker encodes n times (e.g., 10×) more data than a static code.

In some implementations, at an electronic device having a processor, an image of a physical environment is obtained including at least one code of a time-varying visual marker that includes a sequence of codes. In some implementations, the sequence of codes are sequentially produced by a second electronic device. In some implementations, a first indicator in a first portion of the image and a second indicator in a second portion of the image are identified. In some implementations, the first portion and second portion are on opposing sides of a data portion of a code of the time-varying visual marker. In some implementations, the first portion and second portion are different locations in a background section of the data portion of a code of the time-varying visual marker. In some implementations, a code depicted in the image is determined to be a valid code of the sequence of codes of the time-varying visual marker based on comparing the first indicator and the second indicator.

Various implementations disclosed herein include devices, systems, and methods for modifying image capture parameters to ensure capture of all codes of a time-varying visual marker. In some implementations, modifying image-capture parameters (e.g., frame rate) ensures capture of all codes of the time-varying visual marker by dynamically responding to the circumstance in which the time-varying visual marker is displayed. For example, a time-varying visual marker that is displayed at a first frame rate may be decoded using an image sensor (e.g., camera) that captures images with a second, different frame rate, which potentially results in missed codes or inaccurate codes. One or more image-capture parameters may be adjusted to ensure the accurate capturing of all codes of the time-varying visual marker.

In some implementations, at an electronic device having a processor, a sequence of images of a physical environment is obtained via the sensor at a first frame rate, where the physical environment includes a time-varying visual marker that includes a sequence of codes. In some implementations, the sequence of codes are sequentially produced by a second electronic device at a second frame rate. In some implementations, a frame rate discrepancy between the first frame rate and the second frame rate is identified based on content of images of the sequence of images. In some implementations, an image-capture parameter of the sensor is adjusted based on the frame rate discrepancy.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 5 is a diagram illustrating examples validation indicators for codes of time-varying visual markers detectable by an electronic device in a physical environment in accordance with some implementations.

Figure 1:
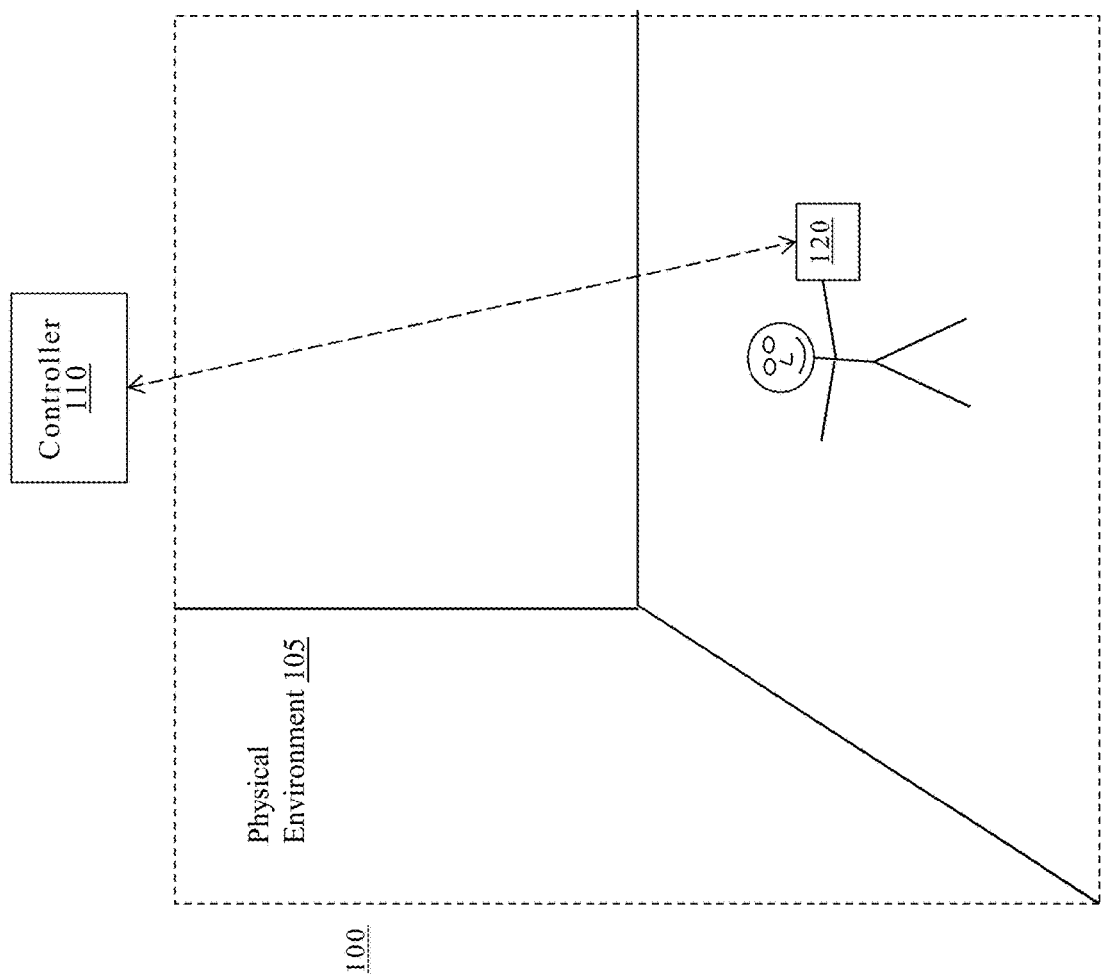
FIG. 1 is a block diagram of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Figure 2:
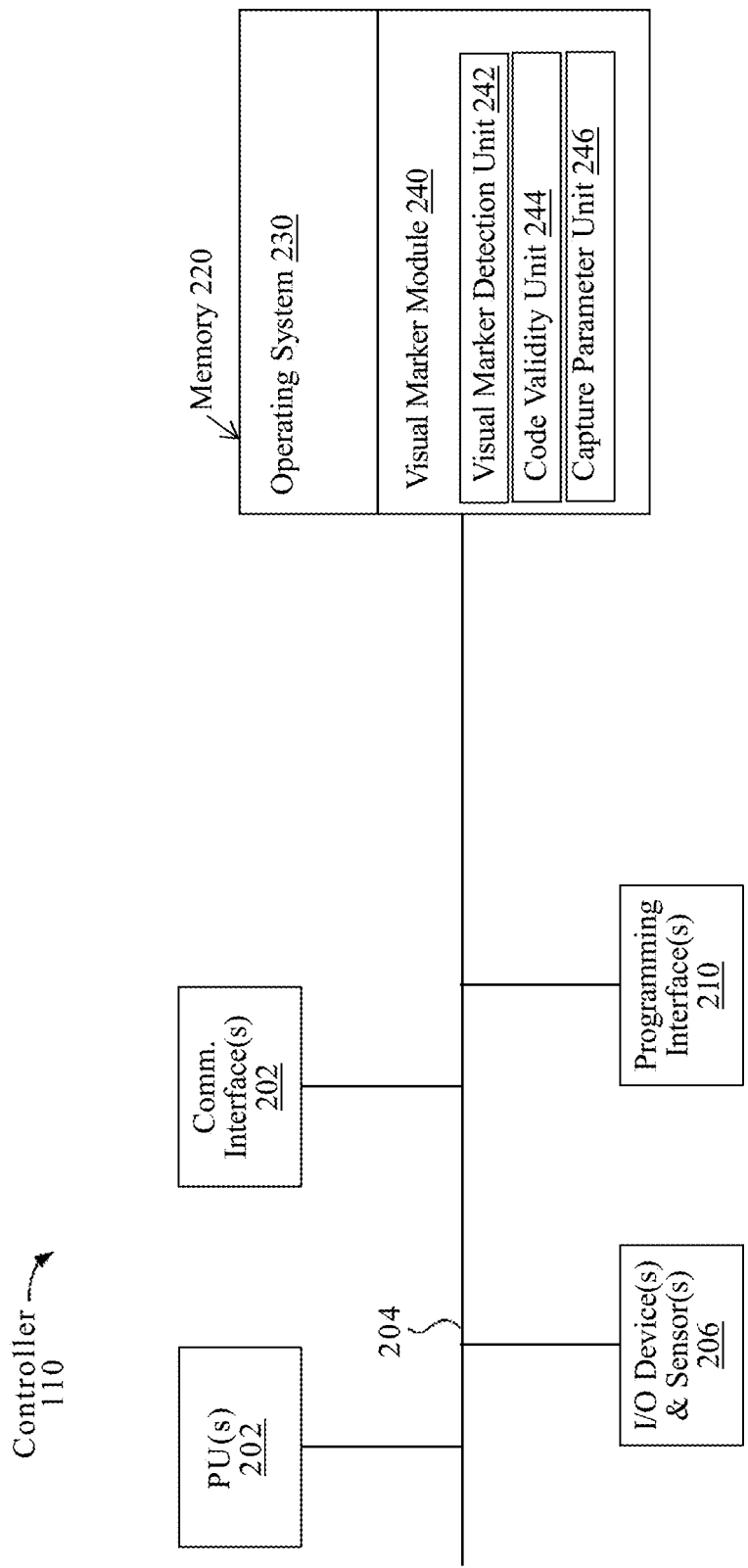
FIG. 2 is a block diagram of an example controller in accordance with some implementations.
Figure 3:
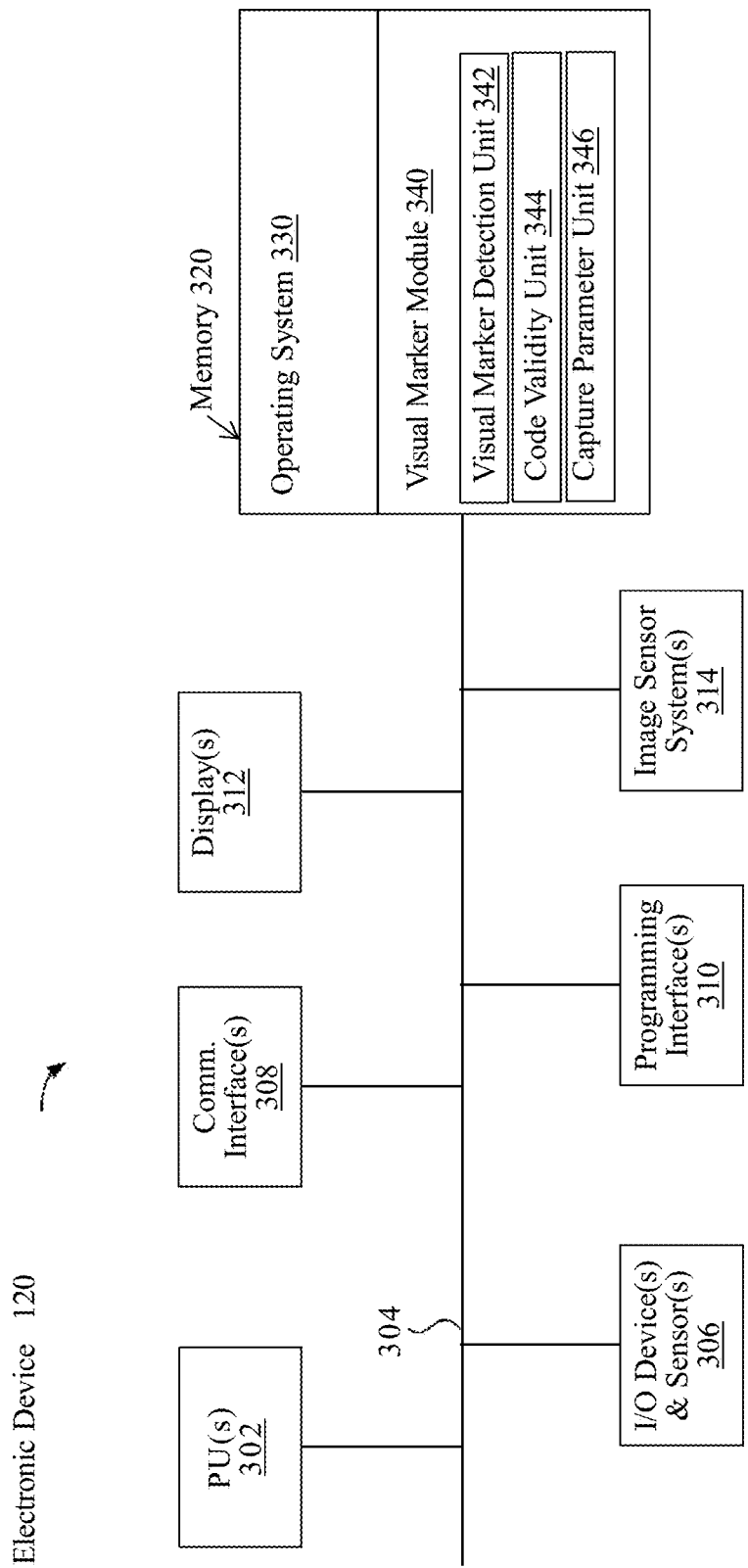
FIG. 3 is a block diagram of an example electronic in accordance with some implementations.

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects or variants do not include all of the specific details described herein. Moreover, well-known systems, methods, components, devices and circuits have not been described in exhaustive detail so as not to obscure more pertinent aspects of the example implementations described herein. While FIGS. 1-3 depict exemplary implementations involving a hand-held mobile electronic device, other implementations may involve other types of devices including, but not limited to, watches and other wearable electronic devices, mobile devices, laptops, desktops, gaming devices, head mounted devices (HMDs), home automation devices, and other devices that include or use image capture devices.

FIG. 1 is a block diagram of an example operating environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a controller 110 and an electronic device 120, one or both of which may be in a physical environment.

A physical environment refers to a physical world that people can sense and/or interact with without aid of electronic systems. The physical environment may include physical features such as a physical surface or a physical object. For example, the physical environment corresponds to a physical park that includes physical trees, physical buildings, and physical people. People can directly sense and/or interact with the physical environment, such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect rotational head movement and, in response, adjust graphical content and an acoustic field presented to the person in a manner similar to how such views and sounds would change in a physical environment. As another example, the XR system may detect rotational or translational movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), adjustments to characteristic(s) of graphical content in an XR environment may be made in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

In some implementations, the controller 110 is configured to detect and use time-varying visual markers or to manage and coordinate the XR environment for the user. The controller 110 is described in greater detail below with respect to FIG. 2. In some implementations, the controller 110 is a computing device that is local or remote relative to the physical environment 105. For example, the controller 110 is communicatively coupled with the electronic device 120 via one or more wired or wireless communication channels (e.g., BLUETOOTH, IEEE 802.11x, IEEE 802.16x, IEEE 802.3x, etc.). In some implementations, the controller 110 and the electronic device 120 are configured to detect and use time-varying visual markers or to present the XR environment to the user together.

In some implementations, the electronic device 120 is configured to detect and use time-varying visual markers or to present the XR environment to the user. The electronic device 120 is described in greater detail below with respect to FIG. 3. In some implementations, the functionalities of the controller 110 are provided by or combined with the electronic device 120, for example, in the case of an electronic device that functions as a stand-alone unit.

FIG. 2 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the controller 110 includes one or more processing units 202 (e.g., microprocessors, application-specific integrated-circuits (ASICs), field-programmable gate arrays (FPGAs), graphics processing units (GPUs), central processing units (CPUs), processing cores, or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a joystick, one or more microphones, one or more speakers, one or more image capture devices or other sensors, one or more displays, or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof including an optional operating system 230 and a visual marker module 240.

The operating system 230 includes procedures for handling various basic system services and for performing hardware dependent tasks.

In some implementations, the visual marker module 240 is configured to identify, share, or manage time-varying visual marker information. In some implementations, the visual marker module 240 includes a visual marker detection unit 242, a code validity unit 244, and a capture parameter unit 246. The visual marker detection unit 242 is configured to detect and rectify codes of time-varying visual markers in images of a physical environment. The code validity unit 244 is configured to verify that an image includes a complete code of the sequence of codes of a time-varying visual marker. The capture parameter unit 246 is configured to adjust image capture parameters to ensure capture of all codes of a time-varying visual marker.

The visual marker module 240 may be implemented as part of an XR application that is configured to present virtual content (e.g., 3D content) that will be used as part of XR environments for one or more users. For example, the user may view and otherwise experience an XR-based user interface that allows the user to select, place, move, and otherwise experience an XR environment based at least in part on detection and use of a time-varying visual marker, for example, via hand gestures, voice commands, input device inputs, etc.

Although these modules and units are shown as residing on a single device (e.g., the controller 110), it should be understood that in other implementations, any combination of these modules and units may be located in separate computing devices. Moreover, FIG. 2 is intended more as functional description of the various features which are present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, or firmware chosen for a particular implementation.

FIG. 3 is a block diagram of an example of the electronic device 120 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the electronic device 120 includes one or more processing units 302 (e.g., microprocessors, ASICs, FPGAs, GPUs, CPUs, processing cores, or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, or the like type interface), one or more programming (e.g., I/O) interfaces 310, one or more displays 312, one or more interior or exterior facing image sensor systems 314, a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), or the like.

In some implementations, the one or more displays 312 are configured to present an XR environment to the user. In some implementations, the one or more displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), or the like display types. In some implementations, the one or more displays 312 correspond to diffractive, reflective, polarized, holographic, etc. waveguide displays. For example, the electronic device 120 includes a single display. In another example, the electronic device 120 includes a display for each eye of the user.

In some implementations, the one or more interior or exterior facing sensor systems 314 include an image capture device or array that captures image data or an audio capture device or array (e.g., microphone) that captures audio data. In some implementations, the one or more image sensor systems 314 are configured to obtain image data that corresponds to at least a portion of the face of the user that includes the eyes of the user. For example, the one or more image sensor systems 314 include one or more RGB cameras (e.g., with a complimentary metal-oxide-semiconductor (CMOS) image sensor or a charge-coupled device (CCD) image sensor), monochrome camera, IR camera, event-based camera, or the like. In various implementations, the one or more image sensor systems 314 further include illumination sources that emit light (e.g., upon a subject or a portion of the face of the user) such as a flash or a glint source.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and a visual marker module 340.

The operating system 330 includes procedures for handling various basic system services and for performing hardware dependent tasks.

In some implementations, the visual marker module 340 is configured to identify, share, or manage time-varying visual marker information. In some implementations, the visual marker module 340 includes a visual marker detection unit 342, a code validity unit 344, and a capture parameter unit 346. The visual marker detection unit 342 is configured to detect and rectify codes of time-varying visual markers in images of a physical environment. The code validity unit 344 is configured to verify that an image includes a complete code of the sequence of codes of a time-varying visual marker. The capture parameter unit 346 is configured to adjust image capture parameters to ensure capture of all codes of a time-varying visual marker.

The visual marker module 340 may be implemented as part of an XR application that is configured to present virtual content (e.g., 3D content) that will be used as part of XR environments for one or more users. For example, the user may view and otherwise experience an XR-based user interface that allows the user to select, place, move, and otherwise experience an XR environment based at least in part on detection and use of a time-varying visual marker, for example, via hand gestures, voice commands, input device inputs, etc.

Moreover, FIG. 3 is intended more as a functional description of the various features which are present in a particular implementation as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, or firmware chosen for a particular implementation.

Figure 4A:
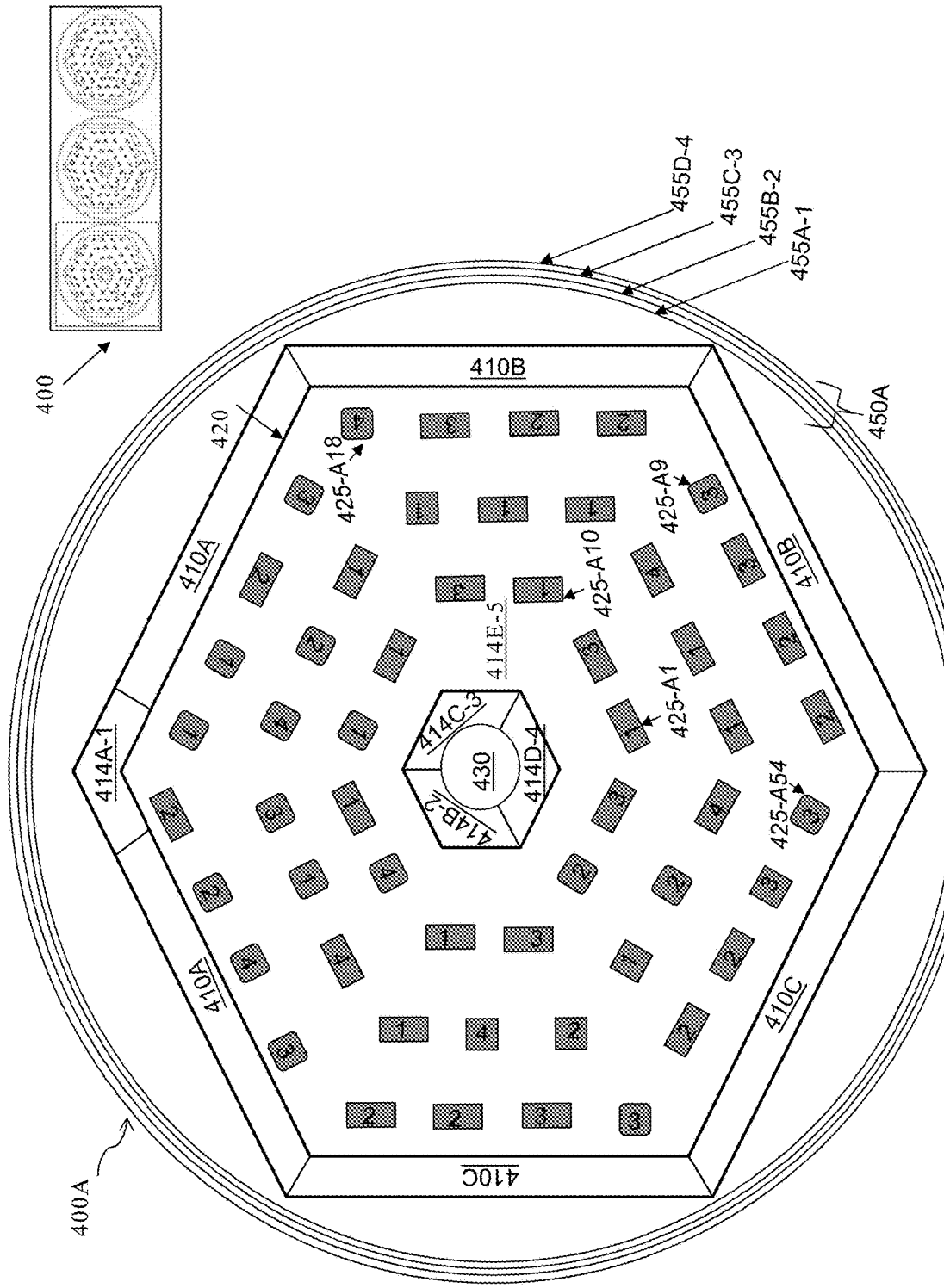
FIGS. 4A-4C are diagrams illustrating an example time-varying visual marker that includes a sequence of codes in accordance with some implementations.
Figure 4B:
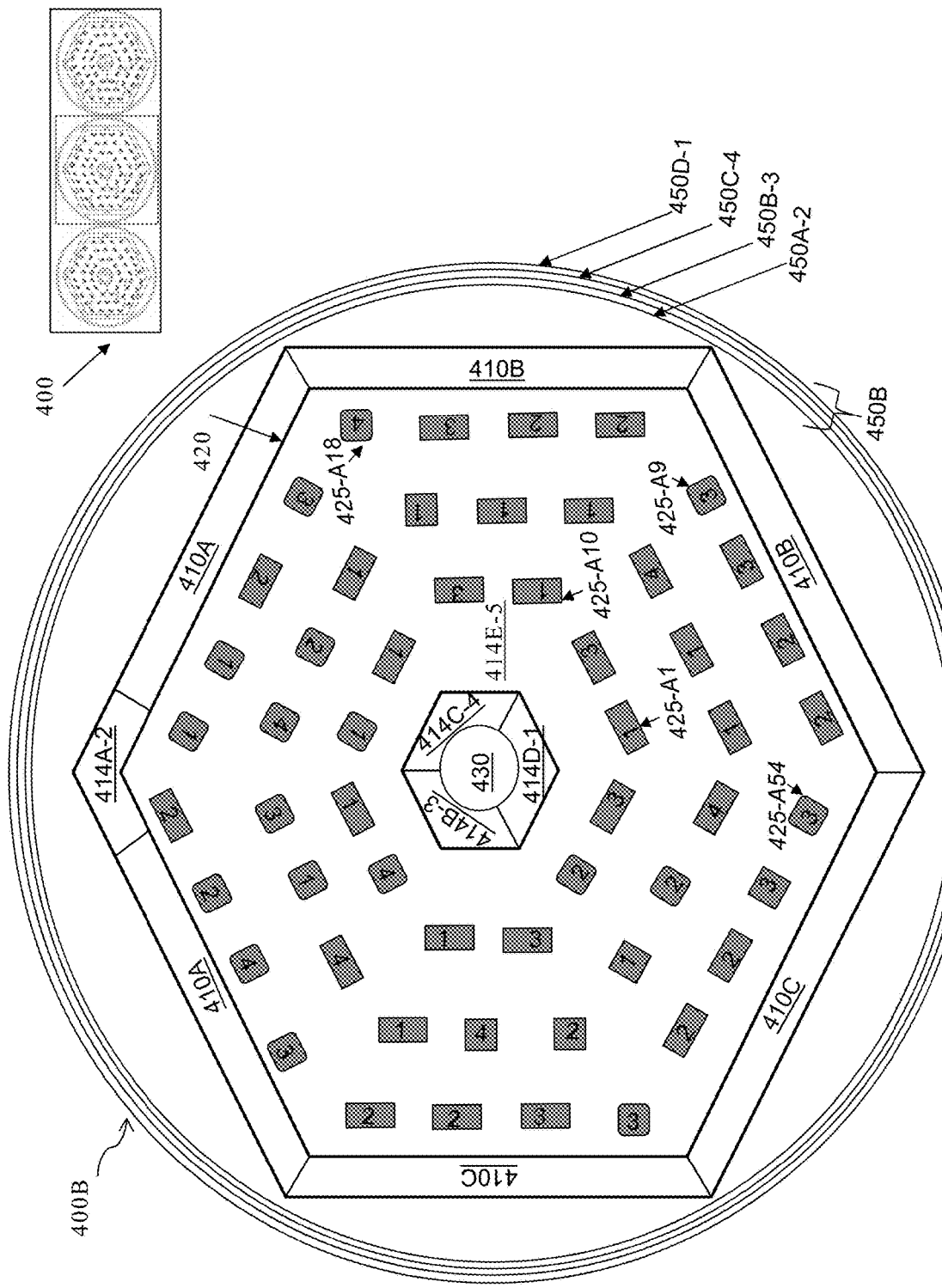
Figure 4C:
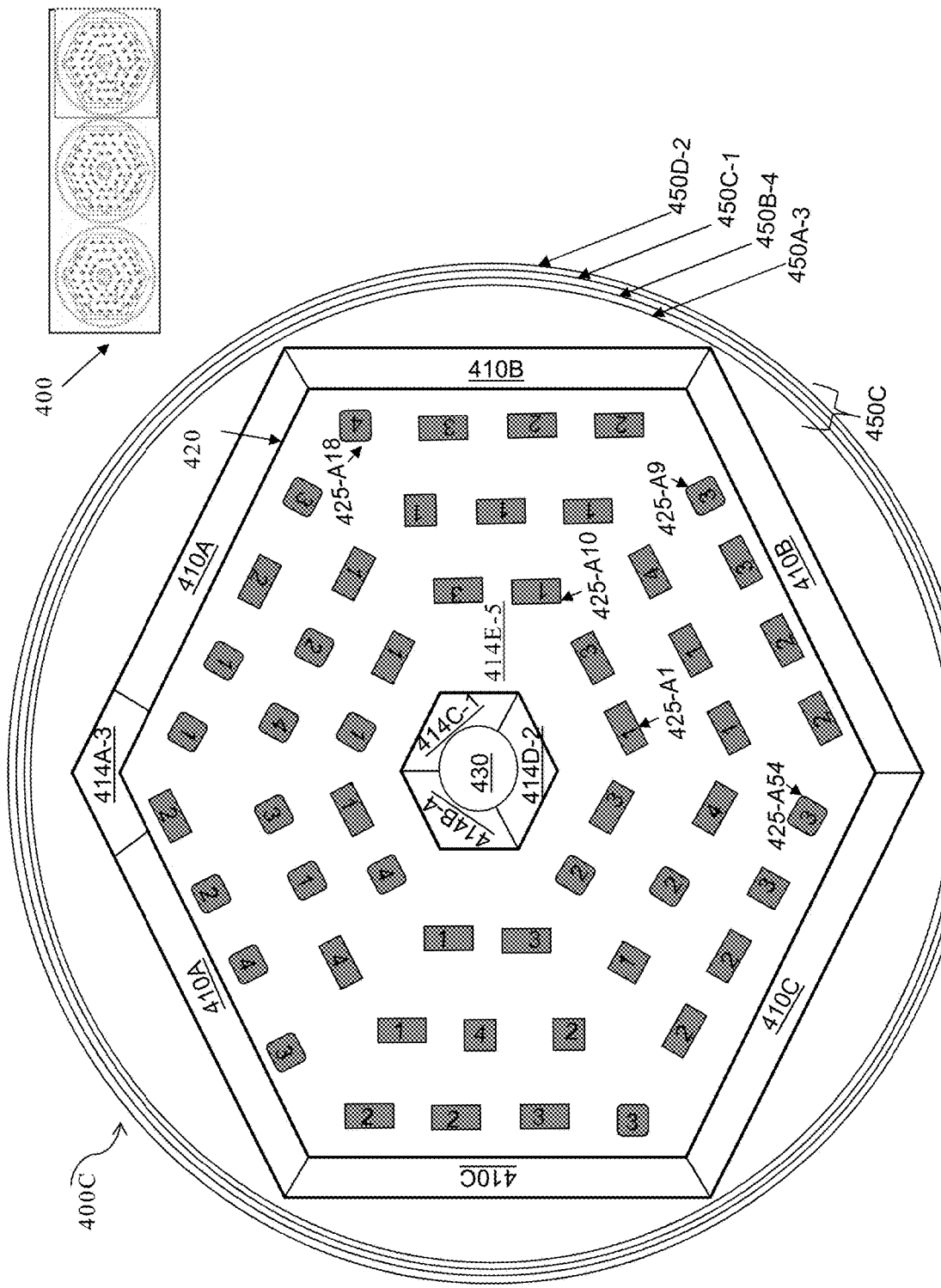

FIGS. 4A-4C are diagrams illustrating an exemplary time-varying visual marker that includes a sequence of codes in accordance with some implementations. As shown in FIGS. 4A-4C, a time-varying visual marker 400 includes a sequence of 3 codes (e.g., 400A, 400B, 400C). In some implementations, the time-varying visual marker 400 includes a sequence of 3 codes having markings that encode data, and thus, the 3 codes of the time-varying visual marker stores 3× more data than a single static visual marker. In some implementations, the codes of the time-varying visual marker 400 are sequentially displayed on a display, projected by a projector, or the like. In some implementations, the display, projector, or the like is self-luminescent, emissive, transmissive, or reflective.

As shown in FIGS. 4A-4C, each of the codes 400A-400C includes a first portion 410 for detection (e.g., rectification or orientation), a third portion 420 to encode data using markings, and a second portion 414 including pre-defined locations (e.g., 414A-414D) in the specific overall shape of the codes that may each be colored with one of the multiple colors (e.g., 1, 2, 3, 4) used in the encoded color markings of the third portion 420 of the codes 400A-400C. In various implementations, one or more of size, shape, color/shade, orientation, or boundary of markings are used to encode data.

As shown in FIG. 4A, the first portion 410 includes a preset shape for detection. In some implementations, the first portion 410 is an outer area having a predefined shape that is consistent for multiple different time-varying visual markers, e.g., time-varying visual markers that encode different data using different colors. As shown in FIG. 4A, the first portion 410 is a thin hexagonal shape with a gap that is used for orientation during reading of the code.

As shown in FIG. 4A, the first portion 410 of the code 400A includes three sections 410A, 410B, and 410C. In some implementations, the three sections 410A, 410B, and 410C are three shades of a single color (e.g., that is not used elsewhere in the code 400A). In some implementations, the three sections 410A, 410B, and 410C are lighter grey, light grey, and grey, where grey is darker than light grey, and light grey is darker than lighter grey.

In some implementations, the first portion 410 is an inner area (e.g., a ring or inner boundary area that partially surrounds a data area) having a specific overall predefined shape. In some implementations, the first portion 410 includes a plurality of predefined shapes distributed about the code 400A. In some implementations, the predefined shape of the first portion 410 enables detection, rectification, or determination of orientation of code 400A. In some implementations, colors of the first portion 410 are variable (e.g., different for different time-varying visual markers), and accordingly, the detection of the code 400A using the first portion 410 is shaped-based and does not use color. In some implementations, colors of the first portion 410 are consistent (e.g., the same for different time-varying visual markers), and accordingly, the detection of the code 400A using the first portion 410 is shaped and color based. In some implementations, the detection of the codes of the time-varying visual marker 400 in an image (e.g., of a physical environment) can be accomplished using computer vision techniques. In some implementations, additional portions of the codes may also be used for detection, rectification, or orientation.

As shown in FIG. 4A, the second portion 414A-D of the code 400A includes known locations or positions in the specific overall shape of the time-varying visual marker 400 that are each colored with one of the data encoding colors used in the time-varying visual marker 400. In some implementations, the data encoding colors are a preset number (e.g., 2-8) of colors. As shown in FIG. 4A, the second portion 414 of the code 400A has 4 locations including a first location 414A (e.g., adjacent the first portion 410), a second location 414B, a third location 414C, and a fourth location 414D. The four locations 414A-414D are each respectively colored with one of the 1, 2, 3, or 4 data encoding colors used for encoding data in colored markings in the third portion 420. In FIG. 4A, for example, the notation 414A-1 indicates that the first location 414A of the second portion 414 has color 1. In some implementations, the second portion 414 can include a different number of locations corresponding to each of the data encoding colors selected for the codes of the time-varying visual marker 400.

In some implementations, the second portion 414 includes a plurality of pixels at each of the 4 known locations 414A, 414B, 414C, and 414D. In some implementations, the second portion 414 is a prescribed shape (e.g., square, triangle, ellipse, etc.) for the known locations 414A, 414B, 414C, and 414D. In some implementations, the second portion 414 includes shapes that are similar or identical to those from the third portion 420 and the 4 known locations (e.g., 414A, 414B, 414C, and 414D) are located at one of these shapes of the second portion 414 colored with one of the 4 colors of the codes of the visual marker 400. In some implementations, the second portion 414 uses known locations based on the specific overall predefined shape of the first portion 410. In some implementations, the second portion 414 uses known locations (e.g., not within the first portion or the third portion 420) based on the specific overall shape of the codes of the time-varying visual marker 400.

In some implementations, the second portion 414 (e.g., 414A, 414B, 414C, and 414D) enable the data in the third portion 420 to be decoded correctly. For example, the code 400A in FIG. 4A of the time-varying visual marker 400 has color 1 at location 414A, color 2 at location 414B, color 3 at location 414C, and color 4 at location 414D to encode data in a corresponding third portion 420. In this example, if color 1 was interpreted as 414B, color 2 was interpreted as 414C, color 3 was interpreted as 414D, and color 4 was interpreted as 414A, the data in the third portion 420 of the code 400A would be incorrectly decoded.

In various implementations, the data encoding colors of the time-varying visual marker 400 can be selected in any manner when the time-varying visual marker 400 is designed, created, or modified. In various implementations, the colors 1, 2, 3, 4 of the codes 400A-400C are identified within each code and can be any colors. In various implementations, the colors of the codes 400A-400C are not pre-defined (e.g., the set of colors used for a given code of the time-varying visual marker that encodes a first data item may be different from the set of colors used for another code of the time-varying visual marker that encodes a second data item).

As shown in FIG. 4A, the third portion 420 encodes the data of the code 400A using markings. In some implementations, the markings of the time-varying visual marker 400 are parameterized by size, shape, color/shade, boundary, orientation, or the like of graphical elements. As shown in FIG. 4A, the third portion 420 encodes the data of the code 400A, which is a portion of the data encoded by the time-varying visual marker 400. In FIG. 4A, the third portion 420 is between the first portion 410 and the 4 locations of the second portion 414. As shown in FIG. 4, the third portion 420 includes colored markings 425 that include combinations of 2 shapes (e.g., square, rectangle) and the 4 colors of the second portion 414. In some implementations, the third portion 420 of the code 400A includes colored shapes 425-A1, 425-A2, . . . , 425-A54 sequentially ordered by quadrant clockwise or counterclockwise from a starting position.

In some implementations, the data encoding colors (e.g., the colors in the second portion 414) may be determined based on detectability. In some implementations, detectability of the data encoding colors is based on one or more of separation in a 3D color space, lighting conditions, printing conditions, displaying conditions, image capture sensors, or aesthetic information.

As shown in FIG. 4A, the code 400A includes a central area 430 in some implementations. In some implementations, the central area 430 is used for decoration (e.g., a company logo). In some implementations, the central area 430 includes specific shapes or color for detection, specific color(s) for color correction (e.g., white balance), or specifically shaped, sized, or angled symbols for orientation or rectification of the code 400A (e.g., in a captured image of a physical environment). In some implementations, the second location 414B, the third location 414C, and the fourth location 414D surround the central area 430.

As shown in FIG. 4A, the third portion 420 may further include a background location 414E that uses the color 5 that is different from colors used in the first portion 410 and the second portion 414. In some implementations, the color 5 of the background location 414E is selected for detectability of the colors 1-4 of the second portion 414. In addition, the color of the background location 414E can change for each of the sequence of codes forming the time-varying visual marker 1000. For artifacts or errors caused by the rolling shutter (e.g., where a top half/portion of the code is updated while the bottom half/portion of the code is not updated), the color of the pixels of the background location 414E can be used to identify the transition from one code in the sequence to another code (e.g., the validation indicator 450 becomes optional). In some implementations, the background location 414E is mapped to a color matching a preset value of binary information (e.g., always mapped to bit value "0").

In some implementations, each of the codes 400A-400C of the time-varying visual marker 400 includes a validation indicator 450A-450C (e.g., a pattern of colored rings) partially surrounding or positioned at prescribed opposing locations with respect the codes of the time-varying visual marker 400. In some implementations, each of the codes 400A-400C of the time-varying visual marker 400 includes a unique validation indicator (e.g., a different order of colored rings identifies each of the codes 400A-400C in the sequence). In some implementations, the validation indicator (e.g., 450A-450C) is implemented in each code of the time-varying marker 400 to enable a device to determine whether a single code of the time-varying marker 400 is in an image.

As shown in FIG. 4A, the code 400A includes a validation indicator 450A surrounding the code 400A. As shown in FIG. 4A, the validation indicator 450A is a concentric series of colored rings. In some implementations, the concentric series of colored rings include 4 rings 455A-455D that each are one color of the four data encoding colors (e.g., colors 1, 2, 3, or 4) depicted in the four locations 414A-414D of the second portion 414, respectively. In FIG. 4A, for example, the notation 455A-1 indicates that the ring 455A has color 1.

In some implementations, the validation indicator 450 including first validation indicator 450A, second validation indicator 450B, and third validation indicator 450C also identifies an order of the sequence of codes 400A-400C of the time-varying visual marker 400. As shown in FIG. 4A, the first validation indicator 450A includes concentric rings 455A-455D with a respective color order of 1, 2, 3, 4. As shown in FIG. 4B, the second validation indicator 450B includes the concentric rings 455A-455D with a respective color order of 2, 3, 4, 1. As shown in FIG. 4C, the third validation indicator 450C includes the concentric rings 455A-455D with a respective color order of 3, 4, 1, 2. In some implementations, the validation indicator 450 includes an indication identifying which code of the sequence of codes 400A-400C is the first code of the sequence.

In some implementations, the validation indicator 450 is a visual pattern surrounding at least the data portion of the codes of the time-varying visual marker 400. In some implementations, the validation indicator 450 is a single or a sequence of distinguishable visual elements surrounding at least the data portion (e.g., 420). In some implementations, the validation indicator 450 is a sequence of distinguishable visual elements such as but not limited to a sequence of distinguishable colored visual elements, distinguishable thickness visual elements, or distinguishable dashed visual elements surrounding at least the data portion. In some implementations, the validation indicator 450 is a single shape (e.g., square, pentagon, hexagon, circle, ovoid, a shape of the boundary of the visual marker, etc.). In some implementations, the validation indicator 450 is a plurality of different shapes (e.g., square, pentagon, hexagon, circle, ovoid, a shape of the boundary of the visual marker, etc.).

FIG. 5 is a diagram illustrating examples validation indicators for codes of time-varying visual markers detectable by an electronic device in a physical environment in accordance with some implementations. As shown in FIG. 5, a validation indicator 550 has a rectangular shape surrounding a code 500 of a time-varying visual marker. As shown in FIG. 5, a validation indicator 550*i* varies a thickness of elements t1, t2, t3 of the validation indicator 550. As shown in FIG. 5, a validation indicator 550*ii* varies a distance d1, d2, d3 between elements of the validation indicator 550. As shown in FIG. 5, a validation indicator 550*iii* varies a style s1, s2, s3 between elements of the validation indicator 550.

In some implementations, the validation indicator 450A-450C is a first indicator in a first portion of the image of the code and a second indicator in a second portion of the image of the code. For example, the validation indicator includes the first indicator and the second indicator on opposing sides of the code or the data portion (e.g., 420) of the codes of the time-varying visual marker 400. In some implementations, the validation indicator includes the first indicator and the second indicator that do not surround the codes or the data portion (e.g., 420) of the codes of the time-varying visual marker 400.

Figure 6:
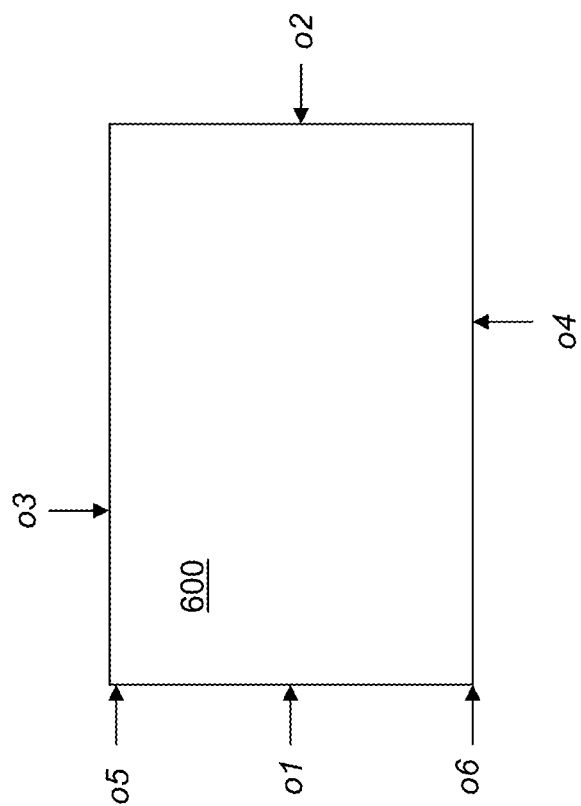
FIG. 6 is a diagram illustrating example locations for a first indicator and a second indicator of a validation indicator for codes of time-varying visual markers detectable by an electronic device in a physical environment in accordance with some implementations.

FIG. 6 is a diagram illustrating example locations for a first indicator (e.g., in a first portion of the image of the code) and a second indicator (e.g., in a second portion of the image of the code) of a validation indicator for codes of time-varying visual markers detectable by an electronic device in a physical environment. As shown in FIG. 6, the first indicator and the second indicator are on opposing sides of a code 600 of a time-varying visual marker. As shown in FIG. 6, a first indicator o1 and a second indicator o2 are at similar locations on opposing sides of the code 600. In some implementations, a first indicator o3 and a second indicator o4 are at different locations on opposing sides of the code 600. In some implementations, a first indicator o5 and a second indicator o6 are on opposing sides of the code 600 because the first indicator o5 is before the data portion in an image and the second indicator o6 is after the data portion in the image. For example, a first indicator o5 and a second indicator o6 are on opposing sides of the code 600 because the first indicator o5 corresponds to a pixel of row 1 (e.g., a first pixel of the first row) of the code (or data portion) in an image and the second indicator o6 corresponds to a pixel in the last row (e.g., the first pixel of the last row).

Figure 8:
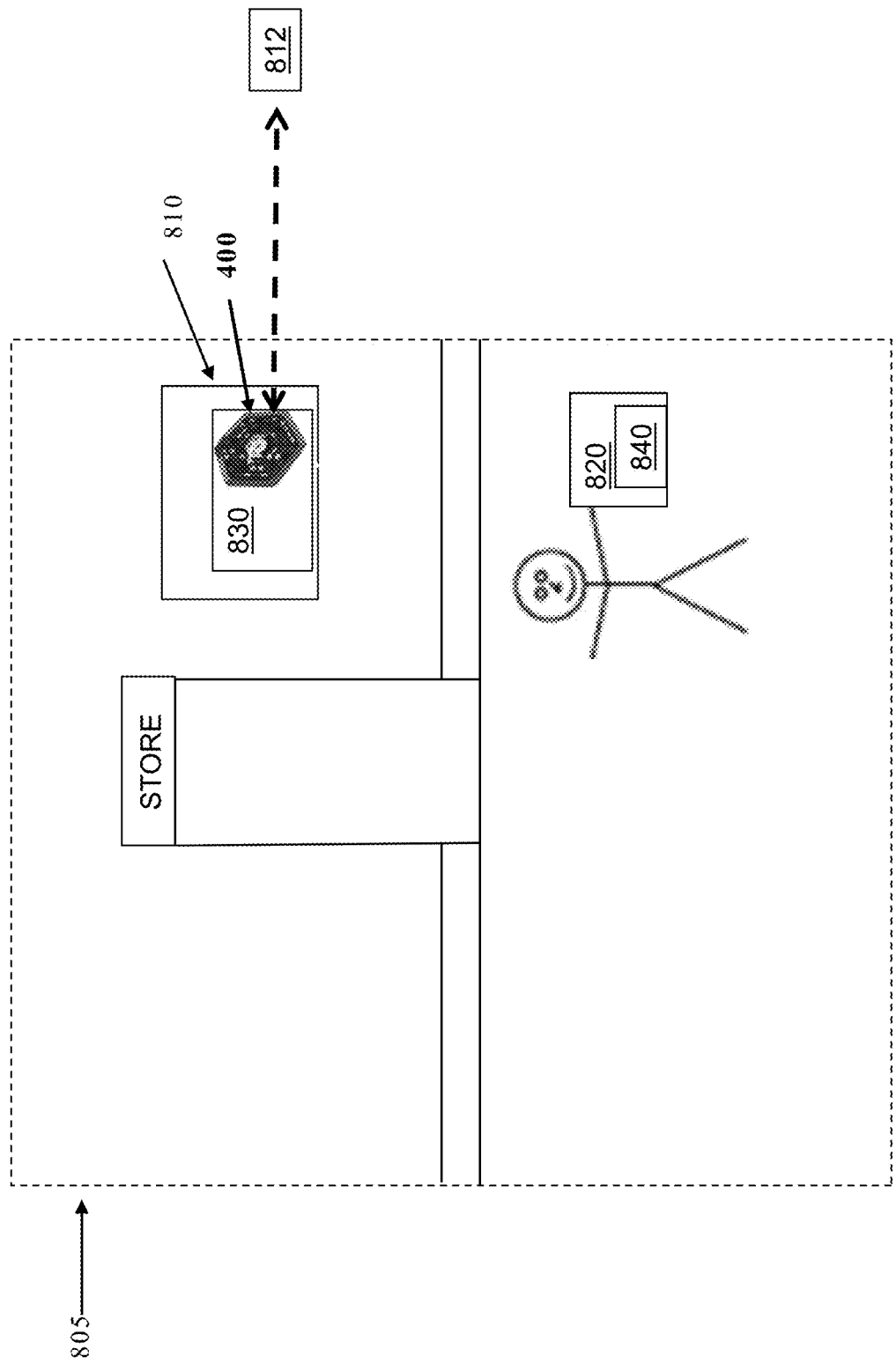
FIG. 8 is a diagram illustrating a time-varying visual marker detectable by an electronic device in a physical environment in accordance with some implementations.

FIG. 8 is a diagram illustrating a time-varying visual marker detectable by an electronic device in a physical environment in accordance with some implementations. As shown in FIG. 8, a time-varying visual marker can be the time-varying visual marker 400 being produced by a first electronic device 810 in a physical environment 805 detected by a second electronic device 820. In some implementations, the time-varying visual marker 400 is intended to be used with digital displays and decoded using digital cameras. In some implementations, the first electronic device 810 includes a visual production device such as a display or projector that has a refresh frame rate (e.g., frames per second (fps)). In some implementations, the refresh frame rate of the electronic device 810 is 60 or 120 fps or unknown to the second electronic device 820. In some implementations, the codes of the time-varying visual marker may be changed between two displayed frames at the visual production device. In some implementations, the codes of the time-varying visual marker may be changed between every preset number (e.g., 10, 13, 20, etc.) of displayed frames at the visual production device. In some implementations, the codes of the time-varying visual marker may be changed every preset time interval (e.g., $\frac{1}{30}$ second, $\frac{1}{10}$ second, $\frac{1}{2}$ second, etc.) while displaying frames at the visual production device. In some implementations, the second electronic device 820 is a mobile electronic device that includes an image capture device or sensor that captures images of the physical environment 805 at a capture frame rate (e.g., 40 fps or unknown). In some implementations, an exposure time of the image capture device (e.g., camera) is less than the capture frame rate (e.g., less than 1/40 second) and images are only captured during the exposure time. In some implementations, the exposure time of the image capture device is independent but less than the actual capture frame rate of the image capture device.

In some implementations, a digital display 830 provides the ability to dynamically change the time-varying visual marker 400 being displayed, which enables the display of multiple codes over time which may collectively encode more information than a single static code. The digital display 830 may display different codes of the time-varying visual marker 400 at a predefined frame-rate. For example, when a single code of the time-varying visual marker 400 can store 1024 bits of information, displaying the 3 codes one after another in the span of 1 second allows the time-varying visual marker 400 to store 3072 bits of information.

In some implementations, the relationship between the refresh rate of the digital display 830 and the capture rate of a camera 840 is unknown. In some implementations, the refresh rate of the digital display 830 and the frame-rate of a camera 840 are not synchronized. In some implementations, a validation indicator at one or more predefined locations identifies a temporal component (e.g., a sequence) of the codes of the time-varying visual marker 400. In some implementations, the temporal component (e.g., an identifier) of the codes of the time-varying visual marker 400 increases an accuracy of decoding. In some implementations, the temporal component (e.g., an identifier) of the codes of the time-varying visual marker 400 identifies which code is the first code in that sequence, e.g., 400A. In some implementations, the first code identifier in the temporal component is an empty code, a code with all bits being 0, or a predefined code.

Returning to FIGS. 4A-C, in some implementations, the four locations 414A-414D of the second portion 414 are each colored with the 1, 2, 3, or 4 data encoding colors, and the four locations 414A-414D are assigned a progression (e.g., 414A, 414B, 414C, 414D). In this example, there are 24 patterns in which the 4 colors can be assigned to the four locations 414A-414D, and each of the 24 patterns represent a different code. In some implementations, by detecting the 4 data encoding colors, registering the pattern, and detecting changes in the patterns, the sequence of codes of the time-varying visual marker 400 (e.g., the next code to be decoded) or the identity of each of the codes of the time-varying visual marker 400 is determined. In some implementations, by detecting the 4 data encoding colors, registering the pattern, and detecting changes in the patterns, the acquisition of all of the codes of the time-varying visual marker 400 may be determined (e.g., code 2 of 3 codes and code 3 of 3 codes were received, but code 1 of 3 codes is missing).

Figure 7:
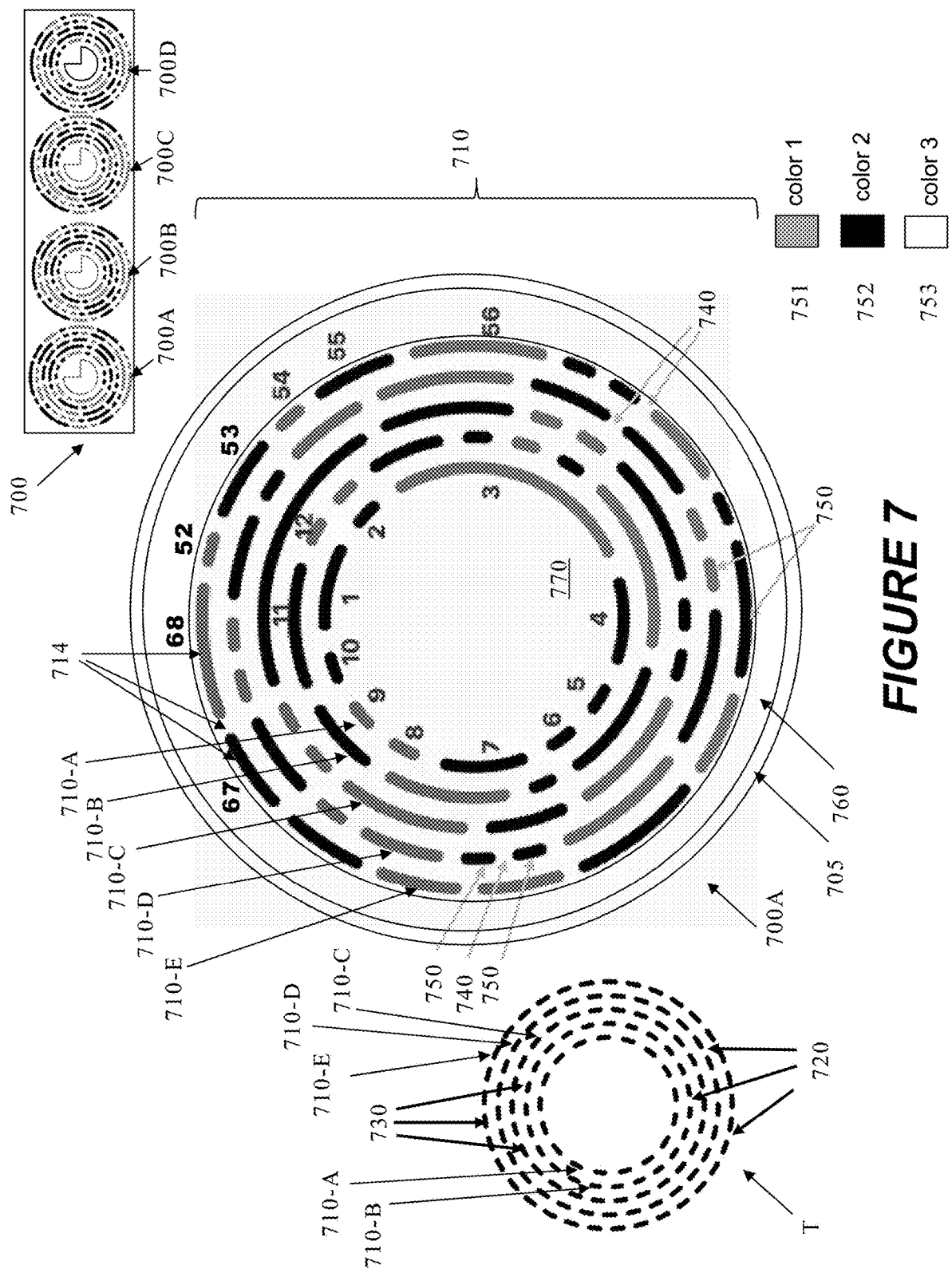
FIG. 7 illustrates an example time-varying visual marker that includes a sequence of codes to conveys data using gaps in a plurality of increasingly larger markings in accordance with some implementations.

FIG. 7 illustrates example codes of a time-varying visual marker that conveys data using gaps in a plurality of increasingly larger markings in accordance with some implementations. As shown in FIG. 7, a time-varying visual marker 700 includes a sequence of 4 codes (e.g., 700A, 700B, 700C, 700D). In FIG. 7, the code 700A is shown in detail and is representative of each of the sequence of codes 700A-700D forming the time-varying visual marker 700. The code 700A includes a plurality (e.g., a series) of increasingly larger surrounding markings, where each of the markings is the same shape. In some implementations, the code 700A includes a plurality of increasingly larger markings, where at least one of the markings uses a different shape. In some implementations, the codes of the time-varying visual marker 700 includes additional features that may be used in combination with, to supplement, or to replace features or capabilities of visual markers as described herein in accordance with some implementations.

In some implementations, information is conveyed in the plurality of markings (e.g., rings 710A-710E) of the code 700A using 2 different techniques. In some implementations, information is conveyed in the plurality of markings (e.g., rings 710A-710E) using a first technique (e.g., closing or not closing template gaps 720 between template sub-markings 730) to form the arcs 750 with the gaps 740 in-between, and a second technique (e.g., color coding a preset number of the arcs 750) using the arcs 750 in the code 700A. Thus, the code 700A of the time-varying visual marker 700 conveys information using gaps in a plurality of markings arranged in a corresponding plurality of shapes of increasing size, and conveys information in colored sub-markings in the plurality of markings in accordance with some implementations.

In some implementations, information is conveyed using the first technique in the code 700A before using the second technique in the code 700A.

As shown in FIG. 7, a template T is an unencoded code and the code 700A is an instance (e.g., conveying information) of the template T. In some implementations, each ring of the plurality of rings 710A-710E may include fixed sub-markings 730 that define a template of positions in the template T that is in every code of the time-varying visual marker 700 (e.g., before being coded, unencoded, or without data) of a type of time-varying visual marker shown in FIG. 7.

In some implementations, each of the rings 710A-710E when encoded with information (e.g., using the template gaps 720) includes a number of the arcs 750 with the gaps 740 in-between. In some implementations, each of the template gaps 720 represent at least a binary digit (bit) of information. In some implementations, in the code 700A, empty template gaps 720 represent a "0" and forms the gaps 740, and each filled template gap 720 represents a "1" and forms the larger sized arcs 750. In some implementations, the size of the template gaps 720 in each of the rings 710A-710E are the same. In some implementations, the size of the template gaps 720 in all of the rings 710A-710E are the same. In some implementations, data represented using a plurality of encoded adjacent gaps (e.g., encoded gaps 720) in the encoded code 700A (e.g., of the plurality of rings 710A-710E) may indicate a data sequence, e.g., 0100101. For example, the code 700A can encode 128 bits (e.g., including parity) using the template gaps 720 between the template sub-markings 730.

In some implementations, the code 700A has a single detectable orientation. In some implementations, the code 700A uses the template gaps 720 to indicate the single detectable orientation. For example, the number of template gaps 720 in each of the rings 710A-710E can be selected so that there is only one orientation where all the template gaps 720 align in the code 700A. In some implementations, respective numbers of the template gaps 720 in each of the rings 710A-710E are respectively selected (e.g., 17, 23, 26, 29, 33) to not have a common divisor, which ensures the single orientation of the code 700A.

In some implementations, the orientation may be used to determine where to start decoding or otherwise to interpret the information conveyed by (e.g., encoded in) the template gaps 720 present in the positions between the template sub-markings 730 in the code 700A. For example, decoding data in the oriented code 700A may begin at 12 o'clock position and go counterclockwise from the innermost ring 710A to the outermost ring 710E to interpret the information represented using the template gaps 720.

In some implementations, a first plurality (e.g., subset) of the arcs 750 in the rings 710A-710E are encoded using color to further convey information. In some implementations, the first plurality of the arcs 750 is a preset number (e.g., 56) of the arcs 750 that are encoded using color to further convey information using the second technique. In some implementations, the color encoding in the second technique uses a minimum number of the arcs 750.

In some implementations, when an instance of the code 700A conveys information in the template gaps 720, a corresponding number of arcs 750 are formed in the rings 710A-710E and each of the first plurality of the arcs 750 conveys additional information using a first color or a second color. As shown in FIG. 7, the arcs 750 of the code 700A are either a first color 751 (e.g., grey) or a second color 752 (e.g., black). In some implementations, the arcs 750 with the first color 751 represent a "0", and the arcs 750 with the second color 752 represents a "1". In some implementations, the first plurality of the arcs 750 are decoded in sequence. For example, as shown in FIG. 7, the first plurality of the arcs 750 (e.g., 56 of the 68 arcs 750) of the code 700A are decoded from 12 o'clock on the innermost ring 710A to 5 arcs 750 in the outermost ring 710E, and the innermost ring 710A may be decoded as 1101111001. In some implementations, a length of the arcs 750 does not influence information conveyed by the code 700A using color.

In some implementations, the arcs 750 use two colors to encode one bit in each of the first plurality of the arcs 750. In some implementations, the code 700A uses 4 colors for the arcs 750 so that each of the arcs 750 that conveys information conveys 2 bits (e.g., 11, 7, 01, 00) of information. In some implementations, more than 4 colors may be used to convey information using the second technique in the code 700A.

In some implementations, the preset number of the first plurality of the arcs 750 is implemented in the code 700A using an indicator or a "flip arc" that interchanges arcs 750 and the gaps 740 when the number of arcs 750 is below a threshold. In one example, the threshold number (e.g., minimum) for the first plurality of arcs 750 may be 56, and when the encoded code 700A results in 30 arcs 750, the "flip arc" is enabled and the information conveyed using (e.g., the first technique) the template gaps 720 between the template sub-markings 730 is interchanged so that the preset number for the first plurality of arcs 750 are available for use with the second technique in the code 700A. In this example, the first encoding of the template gaps 720 uses "closed" to encode a "1" bit and "open" to encode a "0" bit in each respective template gap 720, which results in 30 arcs 750. Accordingly, the "flip arc" is enabled and the data encoded in the template gaps is "flipped" so that in this second encoding of the template gaps 720 uses "closed" to encode a "0" bit and "open" to encode a "1" bit in each respective template gap 720, which results in 98 arcs 750 (e.g., that is over the minimum or preset number of 56 for the first plurality of the arcs 750).

In some implementations, a data value (e.g., bit) needs to be assigned to each color (e.g., for the arcs 750) to convey information using the second technique in the code 700A. In some implementations, the first arc of the first plurality of the arcs 750 that encode information using color indicates which color of the 2 colors in the code 700A is assigned the data value "1" and the second color becomes the data value "0". In some implementations, any of the arcs 750 may be used to indicate the color assigned to the data value "1". In some implementations, a preset sequence of the arcs 750 are used to assign data values to a plurality of colors used in the arcs 750. In some implementations, the first 8 arcs of the first plurality of the arcs 750 indicates data values (e.g., 111, 110, 71, 70, 011, 010, 001, 000) that are respectively assigned to 8 colors used in a visual marker such as the code 700A.

In some implementations, a sequence of codes forming each of the time-varying visual markers can have the same information encoded in their gaps (e.g., the same gaps 740 will be open or closed for all the codes in the sequence) and only the information stored in the colored markings (e.g., in the first plurality of the arcs 750 in each of the codes in the sequence) is changed. For time-varying visual markers where the gaps are fixed and only the information encoded using color is changed, these implementations can be more robust. For example, the gap 740 encoded data can be decoded with reduced or without any influence or errors caused by the transitioning codes and rolling shutter artifacts. Further, a change in the (e.g., gap payload) gaps 740 indicates a new time-varying visual marker has been displayed.

In other implementations, information encoded in the gaps (e.g., the gaps 740) and the colored markings (e.g., in the first plurality of the arcs 750) colors both may be changed in sequence of codes forming each of the time-varying visual markers. For these implementations, an indicator can be included to identify which code of the sequence of codes forming each of the time-varying visual markers appears first in the sequence. For example, a first code of the sequence of codes can be a code with all gaps open to indicate the start of the sequence, or a code with all colored markings (e.g., arcs 750) having the same colors, etc. In another example where a sequence of 10 codes forms each of the time-varying visual markers, the identity of a specific code being displayed can be encoded in the code itself and used to determine where that specific code appears in the sequence of the time-varying visual marker.

In some implementations, a background color (e.g., color 753) of each of a sequence of codes forming a time-varying visual marker 700 is changed. For example, the background color is the color of pixels in a background portion of a data portion of each of the sequence of codes (e.g., ring 710E, third portion 710, etc.). In cases of artifacts or errors caused by the rolling shutter (e.g., where a top half/portion of the code is updated while the bottom half/portion of the code is not updated), the color of the background portion can be used as a validation indicator to identify the transition from one code in the sequence to another code (see validation indicator 450 (e.g., 414E), 550, or first and second validation indicators (e.g., FIG. 6).

In some implementations, the set of colors (e.g., 751, 752, 753 are not pre-defined) used to encode information in the sequence of the codes of the time-varying visual marker 700 are different for adjacent codes (e.g., all codes) in the sequence. In this example, the set of colors of the data portion of each of the sequence of codes (e.g., ring 710E, third portion 710, etc.) can be used as a validation indicator to identify the transition from one code in the sequence to another code. The set of colors can be chosen based on a specifically palette requirement or can be randomly assigned with sufficient contrast difference. In some implementations, the set of colors is based on detectability including one or more of separation in a 3D color space, lighting conditions, printing conditions, displaying conditions, image capture sensors, or aesthetic information. In some implementations, the colors of the time-varying visual marker 700 can be selected in any manner when a visual marker is designed, created, or modified.

In some implementations, a characteristic of the first color 751 and the second color 752 (e.g., the plurality of colors used in the second technique) is used to assign the data values (e.g., highest to lowest data values) to the 2 colors in the code 700A. For example, a luminance characteristic of the 2 colors can be used to assign the data values. As shown in FIG. 7, a luminance value of the first color 751 is greater than a luminance value of the second color 752. In some implementations of the first color 751 and the second color 752, the smallest luminance value is assigned the data bit "0" or the largest luminance value is assigned the data bit "1". In some implementations, an opacity characteristic of the colors used in the code 700A is used to assign the data values.

In some implementations, a background color is provided for the code 700A. As shown in FIG. 7, the background color is a third color 753 (e.g., white). In some implementations, the colors used to convey information using the second technique in the arcs 750 (or the first plurality of arcs 750) are assigned data values based on a relationship among the colors. For example, using a luminance relationship, the first color 751 is closer to the luminance of the third color 753 and the first color 751 is accordingly assigned the data value "0" (and data bit "1" is assigned to the second color 752). In some implementations, other relationships between the colors used in the first plurality of arcs 750 in a visual marker and the background color are used to assign data values to the colors.

As shown in FIG. 7, the codes of the time-varying visual marker 700 include an optional first portion 705 for detection, an optional second portion 714 to identify a set of different colors (e.g., 751-753, etc.) used in the codes, and a third portion 710 (e.g., gaps 720 and/or arcs 750) rings to encode data in the codes 700A-700D. In some implementations, the first portion 705 includes a preset (asymmetric) shape for detection. As shown in FIG. 7, the first portion 705 is an outer ring forming an asymmetric border (e.g., asymmetric fill, asymmetric shading, gradient or the like). In some implementations, the first portion 705 is an asymmetric shape or logo in a center (e.g. center area 770). In some implementations, the first portion 705 is mapped to a color matching a preset value of binary information (e.g., always mapped to bit value "0").

In some implementations, the predefined shape of the first portion 705 enables detection, rectification, or determination of orientation of the codes of the time-varying visual marker 700 (e.g., captured in an image). In some implementations, the detection of the first portion 705 is based on shape or color. In some implementations, the detection of the codes of the time-varying visual marker 700 in an image can be accomplished using computer vision techniques. In some implementations, the codes are rectified based on the image. In some implementations, rectification warps the image to make the codes of the time-varying visual marker 700 appear flat when viewed from a directly overhead orientation.

In some implementations, the second portion 714 uses known locations based on the specific overall predefined shape of the first portion 705 or based on the specific overall shape of each of the codes of the time-varying visual marker 700. As shown in FIG. 7, the second portion 714 is distinct and separate from the first portion 705 and includes the last N−1 arcs and the last gap 720 where N colors are used for the third portion 710 and the background of the third portion 710.

In some implementations, the codes of the time-varying visual marker 700 include an optional detection zone 760 for detection (e.g., in an image) or an optional central area 770. In some implementations, the detection zone 760 is a single color (e.g., grey, white) or one or more colors that are not used elsewhere in the code. In some implementations, the detection zone 760 is an outer area having predefined shape or a predefined ratio of dimensions (e.g., thickness to diameter, at least 2 pixels wide as seen by an image sensor on an electronic device). In some implementations, the central area 770 is used for decoration (e.g., a company logo). In some implementations, a version(s) of the time-varying visual marker 700 is encoded in an inner ring (e.g., 710A) or another portion of the visual marker (e.g., the center area 770).

In alternate implementations, data of the time-varying visual marker 700 is encoded using graphic segments to fill the gaps 720 in each code. In some implementations, the gaps 730 of the sequence of codes are encoded using graphic segments that are parameterized by size, shape, color, orientation, or the like of graphical elements. Then, the data of the time-varying visual marker 700 (e.g., data portion) is decoded based on the parameterized graphic segments. In some implementations, the data portion uses a different prescribed shape than the arcs 750.

Various implementations disclosed herein include devices, systems, and methods that provide a time-varying visual marker including various features described herein (e.g., individually or in combination).

In some implementations, a number of codes and the sequence of the codes of a time-varying visual marker is encoded in a data portion (e.g., the third portion 420) of the codes themselves. Accordingly, even when the refresh rates of the display 830 and the capture rate of the camera 840 are not synchronized, receipt of the codes in a relative order or absolute order and whether all codes have been received may be determined.

However, in some implementations, while changing the display of a current code to a next code of the time-varying visual marker, there is a small time period when the codes would be under transition and visually inconsistent with a single code of the time-varying visual marker. In some implementations, these images of inconsistent codes are detected (e.g., and discarded). In some implementations, only valid images of codes of the time-varying visual marker are used.

Returning to FIG. 8, in some implementations, when the camera 840 uses a rolling-shutter, a captured image of the time-varying marker 400 may include a top portion of the next code and a lower portion of the current code in one image. In some implementations, a validation indicator (e.g., 450) is implemented in each code of the time-varying marker 400 to determine that a single code of the time-varying marker 400 is in the image (e.g., see FIG. 9).

In some implementations, the validation indicator is a first indicator in a first portion of the image of the code and a second indicator in a second portion of the image of the code. In some implementations, the validation indicator includes the first indicator and the second indicator on opposing sides of the data portion (e.g., 420) of the codes of the time-varying visual marker. In some implementations, identifying the first portion and the second portion involves determining a verification direction of an image capture device of the detecting electronic device. In some implementations, the verification direction is top to bottom for a portrait capture by the camera 840 or side to side for a landscape capture by the camera 840 using a rolling shutter.

In some implementations, the validation indicator is a visual pattern (e.g., color) partially surrounding the code or fully surrounding the code. The validation indicator may be any shape (e.g., circle, rectangle, follow the border of the time-varying visual marker, lines or curves on opposite sides, or the like). In some implementations, the visual pattern uses a pattern of one or more of the 4 data encoding colors (e.g., the second portion 414) of the codes of the time-varying visual marker 400. In some implementations, the validation indicator on opposing sides of the code in each image match (e.g., for each valid code of a time-varying visual marker) to enable determination that the same code is displayed from the one side to the other. In some implementations, the validation indicator also identifies an order of the sequence of codes (e.g., 400A-400C) of the time-varying visual marker 400.

In some circumstances, the refresh rate of the display 830 and the capture rate of the camera 840 may be aligned so that the camera 840 regularly misses one or more codes of the time-varying visual marker 400. In some implementations, the capture rate of the camera 840 or other image capture parameters are changed based on analyzing the captured images of the time-varying visual marker 400 by the camera 840 (e.g., see FIG. 10).

In various implementations, the codes of the time-varying visual marker 400 are 2D objects that encode binary data such as strings or other payloads used to access remotely-based experiences 812. In some implementations, the links to the remotely-based experiences 812 include links to initiate payments (e.g., sanctioned payment endpoints), links to websites (e.g., URLs), or links that launch into web-based experiences. In some implementations, the time-varying visual marker 400 is used to launch only into or link only to sanctioned remotely-based experiences 812 authorized by the creator of the time-varying visual marker 400.

As shown in FIG. 8, in some implementations the image of the physical environment 805 is obtained using a sensor (e.g., the camera 840) on the electronic device 820. In some implementations, the sensor can be a RGB camera, stereo cameras, a depth sensor (e.g., time of flight, structured light), a RGB-D camera, one or more 2D cameras, IR cameras, dynamic vision sensors (event cameras), or the like. In some implementations, color images can be used. Alternatively, in some implementations, grayscale images can be used. In some implementations, the captured images are a 2D image or 3D image at the electronic device 820. FIG. 8 illustrates electronic devices 810, 820 that may include some or all the features of one or both of the controller 110 and the electronic device 120.

Figure 9:
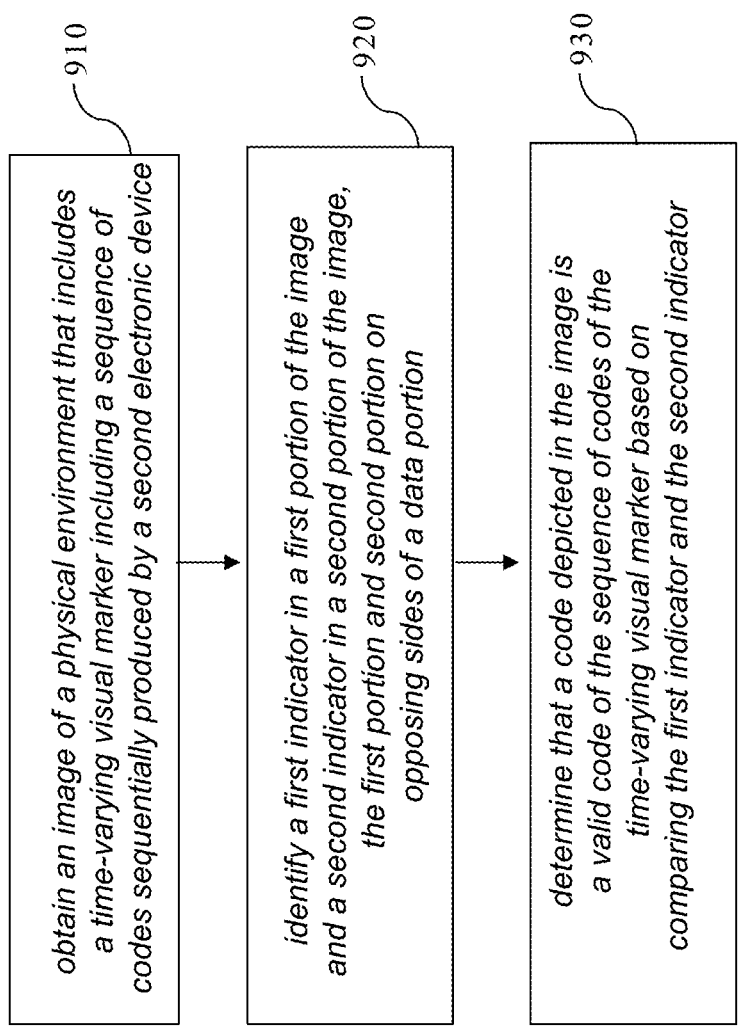
FIG. 9 is a flowchart illustrating an exemplary method of verifying that an image includes a complete code of a time-varying visual marker that displays codes sequentially on a display in accordance with some implementations.

FIG. 9 is a flowchart illustrating an exemplary method of verifying that an image includes a complete code of a time-varying visual marker that displays codes sequentially in accordance with some implementations. For example, when the time-varying visual marker is a sequence of 10 codes having colored markings that encode data, then the 10 code time-varying visual marker encodes 10× more data than a single static code. In some implementations, the verification determines that the image includes a complete code rather than combinations of sequentially-displayed codes that may be included in an image based on use of a rolling shutter. In some implementations, the verification involves comparing a first portion of an image to a second portion of an image. In some implementations, the visual marker may include a surrounding pattern of distinct visual elements that differ for (e.g., identify) each of the different codes. In some implementations, the method 900 is performed by a device (e.g., controller 100 or electronic device 120 of FIGS. 1-3). The method 900 can be performed using an electronic device or by multiple devices in communication with one another. In some implementations, the method 900 is performed by processing logic, including hardware, firmware, software, or a combination thereof. In some implementations, the method 900 is performed by a processor executing code stored in a non-transitory computer-readable medium (e.g., a memory).

At block 910, the method 900 obtains an image of a physical environment, the physical environment including a time-varying visual marker that includes a sequence of codes sequentially produced by a generating electronic device. In some implementations, the time-varying visual marker is displayed on a display or projected by a projector. In some implementations, the display or the projector is self-luminescent, emissive, transmissive, or reflective. In some implementations, each of the codes of the time-varying visual marker includes a validation indicator (e.g., a pattern of colored rings surrounding at least a data portion of the code). In some implementations, each of the codes of the time-varying visual marker includes a unique validation indicator (e.g., a different order of colored rings partially surrounding at least a data portion identifies each code in the sequence).

In some implementations at block 910, a detecting electronic device (e.g., image sensor) detects the time-varying visual marker in the image of the physical environment. In some implementations, a code of the time-varying visual marker is detected in a 2D image or 3D image. In some implementations, the time-varying visual marker is detected by finding a pre-determined shape of a selected portion (e.g., 410) of the code in the image.

At block 920, the method 900 identifies a first indicator in a first portion of the image and a second indicator in a second portion of the image, the first portion and second portion on opposing sides of the data portion (e.g., 420) of the codes of the time-varying visual marker. In some implementations, identifying the first portion and the second portion involves determining a verification direction of an image capture device of the detecting electronic device. In some implementations, the verification direction is top to bottom based on the image capture device using a rolling shutter that rolls top to bottom. In some implementations, the verification direction is left to right based on a rolling shutter rolling left to right when the image capture device is held in a landscape orientation. In some implementations, identifying the first portion and the second portion may involve assessing a column of pixels in the verification direction. For example, identifying the first portion and the second portion may involve assessing a column of pixels in the verification direction to identify a color or a pattern (e.g., of colored rings) on each of the top and bottom of the code in the image. In some implementations, identifying the first portion and the second portion may involve assessing a straight line of pixels to determine opposing sides of the data portion or the code.

At block 930, the method 900 determines that a code depicted in the image is a valid code of the sequence of codes of the time-varying visual marker based on comparing the first indicator and the second indicator. In one implementation, the first indicator (e.g., pattern of ring colors at the top of the image) and matches the second indicator (e.g., pattern of ring colors at the bottom of the image) so the code is valid. In some implementations, determining that the code depicted in the image is a valid code compares a first sequence of distinguishable visual elements of the first indicator and a second sequence of distinguishable visual elements of the second indicator on opposing sides of the data portion.

In some implementations, the first indicator and the second indicator are a visual pattern surrounding the data portion (e.g., encircling rings, non-linear shape, geometric shape, etc.). In some implementations, the first indicator and the second indicator are one or a sequence of distinguishable visual elements surrounding the data portion (e.g., before and after). In some implementations, the first indicator and the second indicator are a sequence of distinguishable visual elements such as but not limited to a sequence of distinguishable colored visual elements, distinguishable thickness visual elements, or distinguishable dashed visual elements surrounding at least the data portion. In some implementations, the first indicator and the second indicator each also identify an order of the sequence of codes of the time-varying visual marker (e.g., when the time-varying visual marker has 3 codes, the first indicator and the second indicator identifies the order to determine: the first code 1, the second code 2, the third 3 of the 3 codes).

In some implementations, the method 900 further decodes the data of the codes of the time-varying visual marker. In some implementations, the usage of the time-varying visual marker in terms of user experience after decoding can be arbitrary. For example, the time-varying code may be displayed on a TV and upon being scanned, the decoded data may help the user select options, obtain information about the movie being displayed on the TV, etc. In another example, the decoded data from the time-varying visual marker when scanned by the user may initiate an application on the scanning device (e.g., smart phone) such as a food delivery app. In some implementations, the time-varying code may be displayed and upon being scanned, the decoded data delivers an audio message or music to the decoding device. In some implementations, a color-interpretation scheme is determined for interpreting colored markings of the codes that encode data. In some implementations, the color-interpretation scheme is determined by identifying a set of colors based on the codes. In some implementations, the set of colors is identified by looking at a set of predetermined locations on the code. For example, a first color is identified based on color 1 being identified in a first particular position on the code, a second color is identified based on color 2 being identified in a second particular position on the code, and so on. In some implementations, the first and second particular positions are located within the shape of the codes (e.g., first portion). In some implementations, the visual marker includes a sequence of colored markings (e.g., 420) in a different preset location on the visual marker. In some implementations, the colored markings of the visual marker are parameterized by size, shape, color, orientation, or the like of graphical elements). Then, the data of the code (e.g., data portion) is decoded based on the colored markings and the set of colors of the color-interpretation scheme. In some implementations, the colored markings of the visual marker each encode 1 bit, 2 bits, 8 bits or more of data.

In some implementations, at block 910, the method 900 determines a relative positioning between the detecting electronic device and the codes of the time-varying visual marker based on the image or images. In some implementations, the relative positioning determines the relative orientation of the code with respect to the detecting electronic device. In some implementations, the relative positioning is determined using computer vision techniques (e.g., VIO or SLAM) or PNP techniques. In some implementations, relative positioning is determined based on stereo image processing (e.g., disparity-based estimation). In some implementations, the relative positioning determines distance or direction from the detecting electronic device to the code. In some implementations, the relative positioning determines the pose (e.g., position and orientation) of the detected code relative to the pose of the detecting electronic device.

In some implementations, the relative positioning is determined at the detecting electronic device by identifying the size or scale of the detected code in the captured image. In some implementations, a distance between the detecting electronic device and the detected code can be determined based on the size of the code. In some implementations, the size or shape of code can be encoded in the code and then directly decoded from the image of the physical environment. In some implementations, the size or shape of code is preset and known by the detecting electronic device. In some implementations, the size or shape of the code is determined using VIO, SLAM, RGB-D image processing or the like at the detecting electronic device.

Alternatively, the distance between the detecting electronic device and the detected code can be determined based on a depth sensor at the detecting electronic device a detecting the code in the physical environment. In some implementations, the depth sensor at the detecting electronic device uses stereo-based depth estimation. In some implementations, the depth sensor at the detecting electronic device is a depth-only sensor (e.g., time of flight, structured light).

In some implementations, once the size or shape of the code is determined, the four corners (e.g., of a square or rectangular code) or circumference (e.g., of a circular code) can be identified in the image. In some implementations, identifying or correcting a distortion between an actual shape of the code and the detected shape of the code in the image determines a direction between the detecting electronic device and the detected code in the physical environment.

In some implementations, the relative positioning determines the distance and direction (e.g., offset) between the detecting electronic device and the detected code using VIO, SLAM or the like at the detecting electronic device.

In some implementations, at block 910, the method 900 rectifies the code based on the image. In some implementations, rectification warps the code from the image to make the code appear flat when viewed from directly overhead orientation. In some implementations, the rectification uses the relative positioning between the detecting electronic device and the code determined from the image using one or more sensors of the detecting electronic device.

In some implementations after the detected visual marker 400 is rectified, a version portion (e.g., first portion) of the visual marker 400 can be used to determine a version of the visual marker. In some implementations, the version(s) of the visual marker 400 varies a number of colors (e.g., the second portion 414) and varies shape encoded data (e.g., the third portion 420). In some implementations, the version(s) of the visual marker 400 varies an amount of data (e.g., a number of rings or a number of gaps in the rings in the third portion (e.g., 1010), a size of the marker, types of shapes, or varies the graphic segments used to encode data (e.g., the third portion). In some implementations, the version(s) of the visual marker 400 is encoded in at least a predefined shape of a portion of the visual marker (e.g., the shape of the first portion 410).

In some implementations, the single color of the three sections 410A, 410B, and 410C is not used in the second portion 414 or the third portion 420 in the codes 400A-400C of the time-varying visual marker 400. In some implementations, the three sections 410A, 410B, and 410C are used to perform local white balancing of colors in the time-varying visual marker 400 upon detection by an image sensor. In some implementations, the three sections 410A, 410B, and 410C are used to detect spatially varying illumination at the detected code 400A-400C or correct for any detected spatially varying illumination. In some implementations, the spatially varying illumination at the detected code 400A-400C is caused by a light source, uneven lighting, objects in the physical environment, or the like.

In some implementations, detecting a time-varying visual marker is a computer vision analysis that classifies an image as containing the codes of the time-varying visual marker or not. In some implementations, the computer vision analysis performs shape detection for the first portion 410. In some implementations, the computer vision analysis can be performed using ML. ML methods for object detection include machine learning-based approaches or deep learning-based approaches. In some implementations, machine learning approaches first define features from a set of data that contains both the inputs and the desired outputs, then uses a classification technique to identify an object. In some implementations, deep learning techniques do end-to-end object detection without specifically defining features, for example, using convolutional neural networks (CNN).

In some implementations at block 910, the image of the physical environment is obtained using a sensor (e.g., camera) on the detecting electronic device (e.g., HMD) having a processor. In some implementations, the image is a 2D image or a 3D image. In some implementations, the sensor can be a RGB camera, a depth sensor, a RGB-D camera, one or more 2D cameras, event cameras, IR cameras, or the like. In some implementations, combinations of sensors are used. In some implementations, the sensor is used to generate the XR environment representing the physical environment. In some implementations, the XR environment is generated using VIO or SLAM position tracking or the like at the detecting electronic device. In some implementations, color images can be used. Alternatively, in some implementations, grayscale images can be used.

Figure 10:
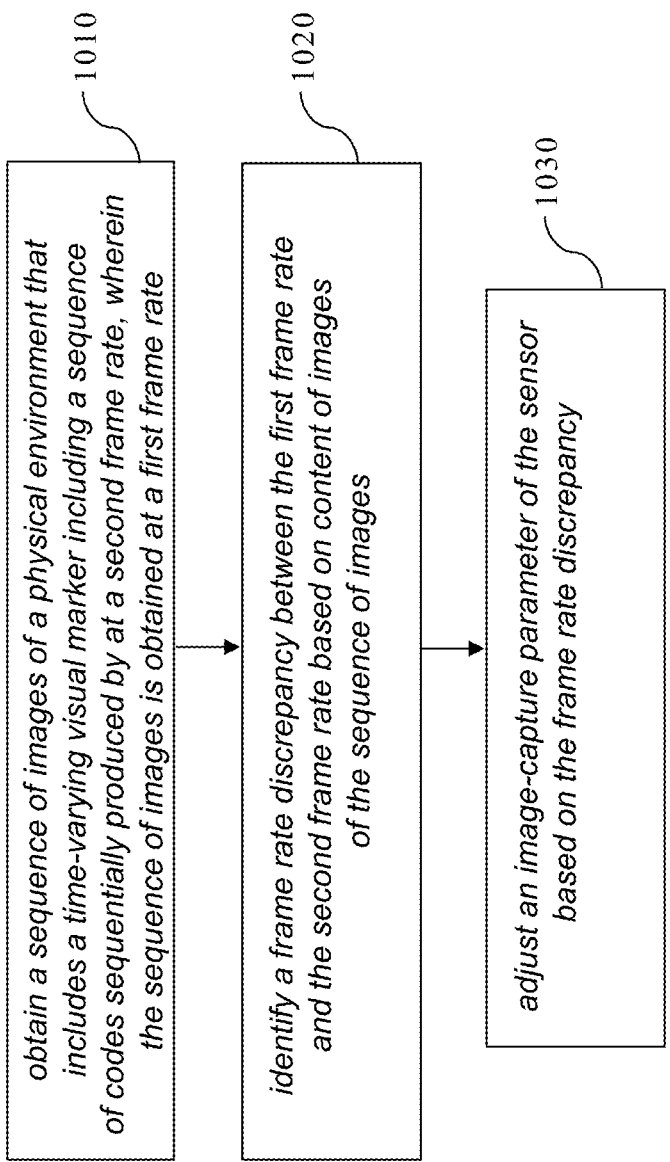
FIG. 10 is a flowchart illustrating an exemplary method of modifying image capture parameters (e.g., frame rate) to ensure capture of all codes of a time-varying visual marker in accordance with some implementations.

FIG. 10 is a flowchart illustrating an exemplary method of modifying image capture parameters (e.g., frame rate) to ensure capture of all codes of a time-varying visual marker in accordance with some implementations. In some implementations, the time-varying visual marker is displayed at a first frame rate and decoded using an image sensor (e.g., camera) that captures images with a second, different frame rate, which may result in missed codes. In some implementations, the second frame rate of the image sensor (e.g., camera) is varied based on analyzing captured images of the codes of a time-varying visual marker. In some implementations, the method 1000 is performed by a device (e.g., controller 100 or electronic device 120 of FIGS. 1-3). The method 1000 can be performed using an electronic device or by multiple devices in communication with one another. In some implementations, the method 1000 is performed by processing logic, including hardware, firmware, software, or a combination thereof. In some implementations, the method 1000 is performed by a processor executing code stored in a non-transitory computer-readable medium (e.g., a memory).

At block 1010, the method 1000 obtains a sequence of images of a physical environment at a first frame rate of a sensor of an electronic device, the physical environment including a time-varying visual marker that includes a sequence of codes sequentially produced by a second electronic device at a second frame rate. For example, camera image capture rate is 30 frames per second (fps), but a monitor display refreshes at 60 or 120 fps. In some implementations, an exposure time of the sensor (e.g., camera) is less than the first frame rate (e.g., less than $\frac{1}{30}$ second) and images are only captured during the exposure. In some implementations, the exposure time of the sensor is independent but less than the actual frame rate of the sensor. In some implementations, the codes of the time-varying visual marker may be changed at between two displayed frames at the monitor. In some implementations, the codes of the time-varying visual marker may be changed between every displayed frame at the monitor. In some implementations, the codes of the time-varying visual marker may be changed between every preset number (e.g., 10, 13, 20, etc.) of displayed frames at the monitor. In some implementations, the codes of the time-varying visual marker may be changed every preset time interval (e.g., $\frac{1}{30}$ second, $\frac{1}{10}$ second, $\frac{1}{2}$ second, etc.) while displaying frames at the monitor. In some implementations, the visual marker is detected in a 2D image or 3D image of an image sensor at the electronic device by finding a pre-determined shape of a selected portion of the code.

At block 1020, the method 1000 identifies a frame rate discrepancy between the first frame rate and the second frame rate based on content of images of the sequence of images. In some implementations, the frame rate discrepancy detects skipped codes based on detecting that the sequence of images excludes one or more of the sequence of codes of the time-varying visual marker. For example, the frame rate discrepancy may detect that codes 2 and 4 of a 5 code time-varying visual marker have been skipped and are not contained in the sequence of images captured by the camera at the first frame rate. In some implementations, the frame rate discrepancy between the first frame rate and the second frame rate detects incomplete codes based on incomplete code content in one or more of the images of the codes of the time-varying visual marker. For example, the frame rate discrepancy may detect that 40% of code 4 and 20% of code 5 of a 5 code time-varying visual marker are not contained in the sequence of images captured by the camera at the first frame rate.

At block 1030, the method 1000 adjusts an image-capture parameter of the sensor based on the frame rate discrepancy. In some implementations, the first frame rate (e.g., camera capture rate) is adjusted to improve or increase the number of codes of the time-varying visual marker that are captured. In some implementations, the first frame rate (e.g., camera capture rate) is adjusted to improve or increase an amount of one or more codes of the time-varying visual marker that are captured. In some implementations, the image-capture parameter of the sensor includes zoom-in or zoom-out, shutter speed (e.g., based on ambient light sensor), capture fps, flash (e.g., intensity or speed), or the like. In some implementations, adjusting the image-capture parameter of the sensor further includes increasing or decreasing the first frame rate based on the frame rate discrepancy. For example, the first frame rate (e.g., camera capture rate) is increased from 30 fps up to 40 fps based on the frame rate discrepancy.

In some implementations, the codes of the time-varying visual marker each include distinct indicators. In some implementations, the distinct indicators uniquely identify each code in the sequence of the codes of the time-varying visual marker. In some implementations, the distinct indicators are a pattern of one or distinct visual elements or an order of colored rings that at least partially surround each of the codes of the time-varying visual marker and identify where that code is in the sequence of codes of the time-varying visual marker.

In some implementations, a system includes a non-transitory computer-readable storage medium; and one or more processors coupled to the non-transitory computer-readable storage medium, wherein the non-transitory computer-readable storage medium includes program instructions that, when executed on the one or more processors, cause the system to perform exemplary methods disclosed herein. In some implementations, a non-transitory computer-readable storage medium, stores program instructions computer-executable on a computer to perform operations including exemplary methods disclosed herein.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various objects, these objects should not be limited by these terms. These terms are only used to distinguish one object from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "or" as used herein refers to and encompasses any and all possible combinations of one or more of the associated listed items. It will be further understood that the terms "comprises" or "comprising," when used in this specification, specify the presence of stated features, integers, steps, operations, objects, or components, but do not preclude the presence or addition of one or more other features, integers, steps, operations, objects, components, or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations, but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:
    at an electronic device having a processor:
        obtaining an image of a physical environment, the physical environment comprising a time-varying visual marker that includes a sequence of codes sequentially produced by a second electronic device;
        identifying a first indicator in a first portion of the image and a second indicator in a second portion of the image, the first portion and second portion on opposing sides of a data portion; and
        determining that a code depicted in the image is a valid code of the sequence of codes of the time-varying visual marker based on comparing the first indicator and the second indicator.

2. The method of claim 1, wherein codes of the sequence of codes include distinct indicators.

3. The method of claim 1, wherein identifying the first indicator and the second indicator comprises determining a verification direction of an image capture device of the electronic device.

4. The method of claim 1, wherein identifying the first indicator and the second indicator comprises determining a direction of a rolling shutter of an image capture device of the electronic device.

5. The method of claim 1, wherein identifying the first indicator and the second indicator comprises determining a verification direction of an image capture device of the electronic device to assess a column of pixels in the verification direction to compare a first visual pattern of the first indicator above the data portion and a second visual pattern of the second indicator below the data portion.

6. The method of claim 1, wherein the first indicator and the second indicator are a matching visual pattern.

7. The method of claim 1, wherein the first indicator and the second indicator are a visual pattern surrounding the data portion.

8. The method of claim 1, wherein the first indicator and the second indicator are a sequence of distinguishable visual elements having a preset shape.

9. The method of claim 1, wherein the first indicator and the second indicator are a sequence of distinguishable colored visual elements, distinguishable thickness visual elements, or distinguishable dashed visual elements surrounding the data portion.

10. The method of claim 1, wherein the first indicator and the second indicator are a sequence of distinguishable colored visual elements that identifies an order of the sequence of codes of the time-varying visual marker.

11. The method of claim 1, wherein the first indicator and the second indicator are in a background portion of the data position, wherein a background color of the background portion in adjacent codes in the sequence of codes are different.

12. The method of claim 1, wherein the time-varying visual marker is displayed on a display or projected by a projector, and wherein the data portion includes colored markings that encode data using a set of gaps, color, shape, orientation, or size.

13. A non-transitory computer-readable storage medium, storing program instructions computer-executable on a computer to perform operations comprising:
at an electronic device having a processor:
obtaining an image of a physical environment, the physical environment comprising a time-varying visual marker that includes a sequence of codes sequentially produced by a second electronic device;
identifying a first indicator in a first portion of the image and a second indicator in a second portion of the image, the first portion and second portion on opposing sides of a data portion; and
determining that a code depicted in the image is a valid code of the sequence of codes of the time-varying visual marker based on comparing the first indicator and the second indicator.

* * * * *